H. W. SCHWIMMER.
WARMING TABLE.
APPLICATION FILED SEPT. 30, 1918.
1,433,157.
Patented Oct. 24, 1922.
2 SHEETS—SHEET 1.
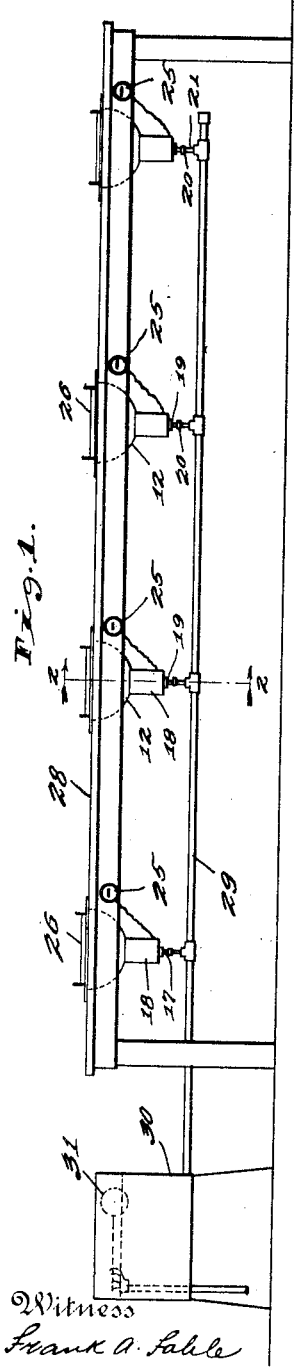
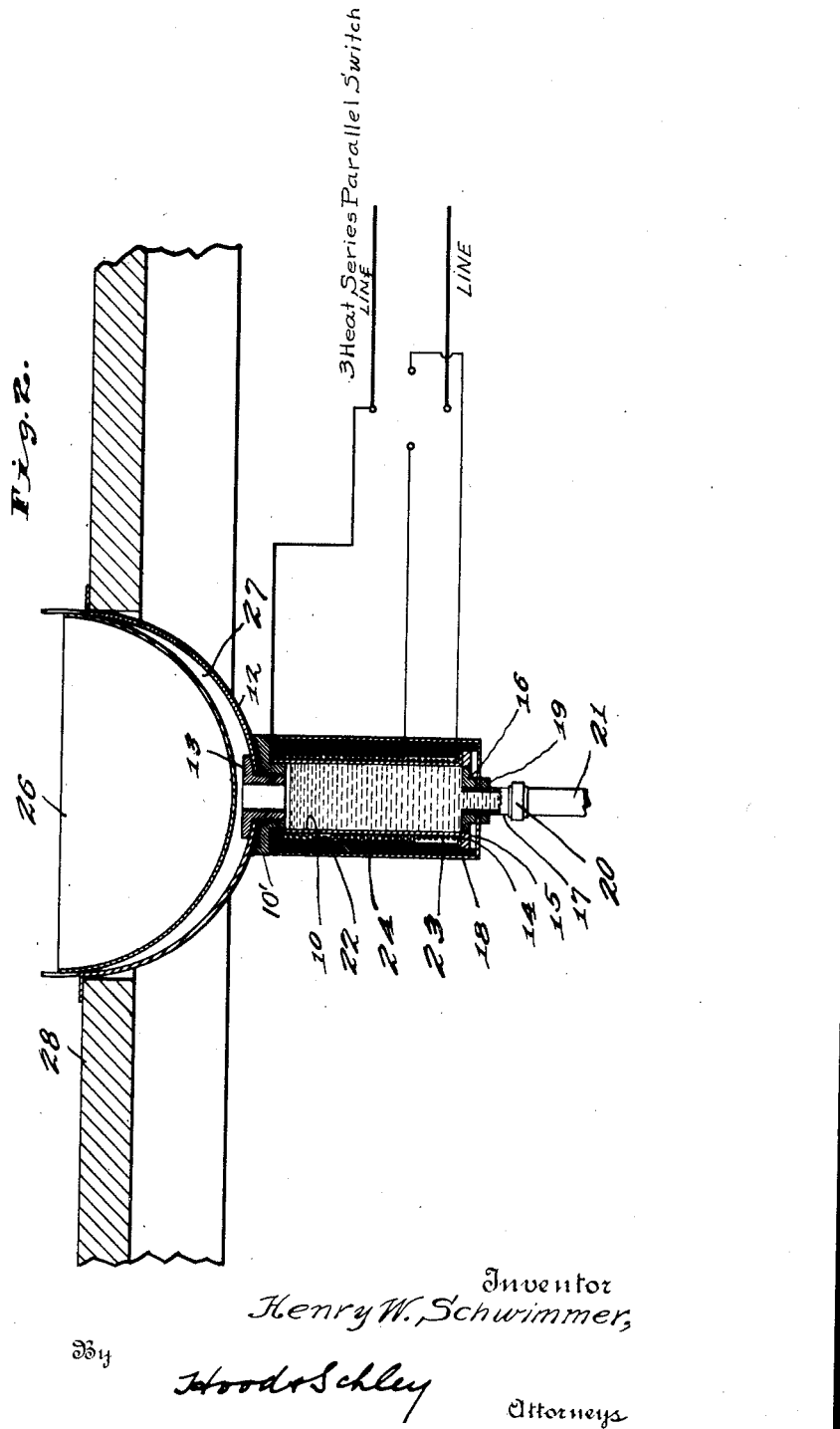

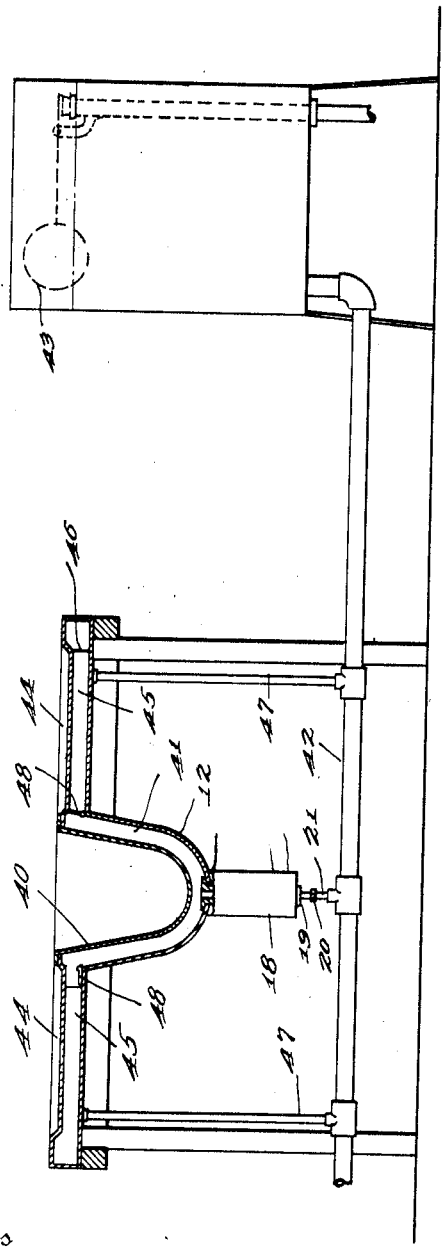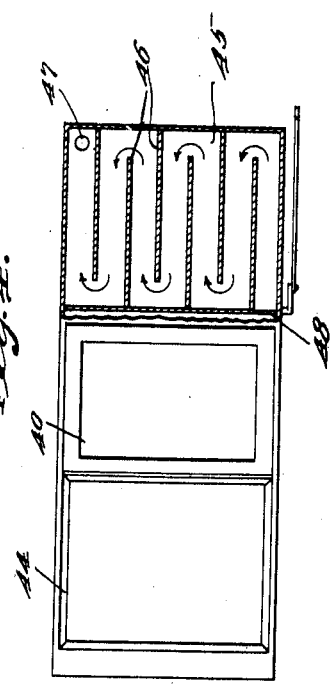

Patented Oct. 24, 1922.

1,433,157

UNITED STATES PATENT OFFICE.

HENRY W. SCHWIMMER, OF INDIANAPOLIS, INDIANA, ASSIGNOR TO YOUNG MOORE, TRUSTEE, OF INDIANAPOLIS, INDIANA.

WARMING TABLE.

Application filed September 30, 1918. Serial No. 256,324.

*To all whom it may concern:*

Be it known that I, HENRY W. SCHWIMMER, a citizen of the United States, residing at Indianapolis, in the county of Marion and State of Indiana, have invented new and useful Warming Tables, of which the following is a specification.

The object of my invention is to produce a confectioners' warming table element, of such character that prompt and efficient warming action may be obtained under such conditions as to be readily under control of individual operators; the construction being especially designed for use in keeping, in proper consistency, cream filling, chocolate coatings, etc.

The accompanying drawings illustrate my invention. Fig. 1 is a side elevation of a cream-filling warming table embodying my invention; Fig. 2 a section on a larger scale on line 2—2 of Fig. 1; Fig. 3 an elevation in partial vertical section of a chocolate-coating warming table; and Fig. 4 a plan of the parts shown in Fig. 3, in partial horizontal section.

In the drawings, 10 indicates a thin copper tube secured at its upper end to an internally-threaded flanged head 10' which is clamped to the under side of a kettle 12 by means of a threaded nut 13. The lower end of tube 10 is externally flanged at 14 and reinforced by a ring 15 into which is threaded a head 16 into which is threaded a nipple 17 over which is sleeved an upwardly-presented cup-like guard, or retainer, 18, which is sleeved up over the tube 10 and held removably in place by nut 19 threaded on nipple 17. Nipple 17 receives at its lower end one member of a common coupling 20 for connection with a water supply pipe 21. Wrapped around tube 10 are electric heating elements 22 and 23 embedded in, or covered by, suitable insulation 24 which, in turn, is covered and guarded by the cup 18.

Coils 22 and 23 are adapted for connection to a suitable energizing circuit through controlling switch 25 in a common manner.

The structure thus far described is suitable for any warming purpose for confectioners' use, or, in fact, any where a heating of liquid is desired.

For heating pots containing filling cream, it is desirable to maintain a degree of heat somewhat less than 212° Fahrenheit, and, therefore, the cream-containing pots 26 are set in the kettles 12 in such manner as to form a vapor space 27, into which vapor produced by heating water within tube 10 may rise. A plurality of cream-warming elements may be arranged side by side in a work-table 28 and, as it is desirable that the level of water in tube 10 should not rise into the vapor space 27, the several pipes 21 may be connected to a main feeder pipe 29, leading from a reservoir 30, in which a desired level may be maintained by an ordinary float valve 31.

By the above arrangement, a very rapid action may be obtained in each individual pot structure, the degree of rapidity depending upon whether one or both of the heating coils is put into action. In any event, the quantity of water within tube 10 is always comparatively small and thus rapid heating is obtained, the supply of needed water to each pot structure being in no wise dependent upon the supply to any other pot structure.

In case a chocolate coating is to be handled, the degree of heat required will always be about 90°-92° Fahrenheit, and consequently it is desirable to maintain the chocolate containing pot 40 in a water bath which is formed in the space 41 between kettle 12 and pot 40. It is obvious that in this arrangement the water supply, received through the pipe 42, connected to pipe 21, is maintained at the desired higher level by the float valve 43. In the handling of a chocolate coating, it is also desirable that the operating table itself be maintained at a desired warmth and therefore I flank each pot 40 with shallow pan-like operating tables 44, beneath each of which is formed a water space 45 communicating with the water space 41. I prefer to arrange baffle plates 46 in the water spaces 45 so as to insure a circulation of the heating water at the sides or edges of each table and, in order to further facilitate such circulation, I provide a return pipe 47 for each table 44, and an adjustable valve 48 at the entrance to each water space 45 from water space 41, said valve being individually adjusted.

By the above arrangement, owing to the small quantity of water contained in the tube 10, a very rapid heating and circulation of the water in the spaces 41 and 45 may be obtained, and the amount of heat applied to any one of the tables 44 may be readily controlled.

The connection between the heating tube 10, the kettle 12 and the supply pipe 21 is of such character that the tube and supply pipe may be readily disconnected and the tube 10 cleared from end to end of any lime or other sludge which will accumulate therein, as a result of the rapid heating of the water.

I claim as my invention:

1. A warming table comprising a kettle, a vertically-arranged small-volume tube communicating with the bottom of said kettle, an electric heating element associated with said tube longitudinally thereof, a supply pipe leading into the lower end of said tube, a materially restricted outlet from said tube to the kettle to cause the water of the tube to spurt into the kettle, and means for maintaining a constant level supply for said tube.

2. A warming table comprising a kettle, a vertically-arranged small-volume tube communicating with the bottom of said kettle, an electric heating element associated with said tube longitudinally thereof, a supply pipe leading into the lower end of said tube, and a materially restricted outlet from said tube to the kettle to cause the water to spurt into the kettle.

3. A warming table comprising a kettle, a comparatively small-volume vertically-arranged tube communicating with the bottom thereof, an electric heating element associated with said tube longitudinally thereof, a water supply pipe leading into said tube at its lower end, a materially restricted outlet from said tube to the kettle, to cause the water to spurt into the kettle, a pot arranged in the kettle to form a water chamber for the pot, a work table flanking the pot, a water chamber formed beneath the work table and communicating with the said pot water chamber, a circulation connection with the water supply pipe, a valve for controlling the flow of water from the pot water chamber into the table water chamber, and means for maintaining a constant level supply of water for the tube.

4. A warming table comprising a kettle, a comparatively small-volume vertically-arranged tube communicating with the bottom thereof, an electric heating element associated with said tube longitudinally thereof, a water supply pipe leading into said tube at its lower end, a materially restricted outlet from said tube to the kettle, a pot arranged in the kettle to form a water chamber for the pot, a work table flanking the pot, a water chamber formed beneath the work table and comprising a tortuous passage communicating at one end with the pot water chamber, a circulation connection between the other end of said tortuous passage and the water supply pipe, a valve for controlling the flow of water from the pot water chamber into the tortuous passage, and means for maintaining constant level supply of water for the tube.

5. A warming table comprising a kettle, a comparatively small-volume tube communicating with the bottom of said kettle, a materially restricted outlet from said tube to the kettle to cause the water to spurt into the kettle, a water supply pipe leading into the lower end of said tube, means for supporting said tube between the kettle and water supply pipe and of such character as to be removable to permit ready clearing of the tube from end to end, and an electric heating element associated with said tube longitudinally thereof.

In witness whereof, I have hereunto set my hand at Indianapolis, Indiana, this nineteenth day of September, A. D. one thousand nine hundred and eighteen.

HENRY W. SCHWIMMER.